United States Patent
Moore

(10) Patent No.: US 7,681,493 B2
(45) Date of Patent: Mar. 23, 2010

(54) OUTDOOR SMOKING SYSTEM

(76) Inventor: Nathan E. Moore, 310 Annette Dr., Slidell, LA (US) 70458

( * ) Notice: Subject to any disclaimer, the term of this patent is extended or adjusted under 35 U.S.C. 154(b) by 1012 days.

(21) Appl. No.: 11/298,294

(22) Filed: Dec. 8, 2005

(65) Prior Publication Data

US 2007/0131234 A1   Jun. 14, 2007

(51) Int. Cl.
 *A47J 37/00* (2006.01)
(52) U.S. Cl. .............. 99/339; 99/480; 99/481; 99/482; 126/25 R
(58) Field of Classification Search .......... 99/340, 99/344–346, 448–450, 481, 482
See application file for complete search history.

(56) References Cited

U.S. PATENT DOCUMENTS

| | | | | |
|---|---|---|---|---|
| 2,060,992 A * | 11/1936 | Jackson | .......... | 99/346 |
| 2,851,941 A * | 9/1958 | Cogar | .......... | 99/352 |
| 4,664,026 A * | 5/1987 | Milloy | .......... | 99/352 |
| 4,700,618 A * | 10/1987 | Cox, Jr. | .......... | 99/339 |
| 5,195,423 A * | 3/1993 | Beller | .......... | 99/340 |
| 5,460,159 A * | 10/1995 | Bussey | .......... | 126/25 R |
| 5,713,267 A * | 2/1998 | Wilson | .......... | 99/482 |
| 5,749,354 A * | 5/1998 | Lin | .......... | 126/25 R |
| 6,012,381 A * | 1/2000 | Hawn | .......... | 99/340 |
| 6,038,964 A * | 3/2000 | Sikes | .......... | 99/340 |
| 6,820,538 B2 * | 11/2004 | Roescher | .......... | 99/340 |
| 7,159,509 B2 * | 1/2007 | Starkey | .......... | 99/339 |

* cited by examiner

*Primary Examiner*—Tu B Hoang
*Assistant Examiner*—Brian Jennison
(74) *Attorney, Agent, or Firm*—Ungaretti & Harris LLP

(57) ABSTRACT

An outdoor smoking system including a smoking device coupled to a cooking vessel. The smoking device includes a feed chute for continuously supplying fuel to a burning chamber without user intervention. The feed chute is positioned above the burning chamber to gravity feed the fuel into the burning chamber. A grate positioned in the bottom wall of the burning chamber allows ash created by the burning to fall out of the chamber into an ash tray. As ash leaves the chamber through the grate, additional fuel in the feed chute is allowed to enter, maintaining a substantially constant burning mass in the burning chamber.

20 Claims, 2 Drawing Sheets

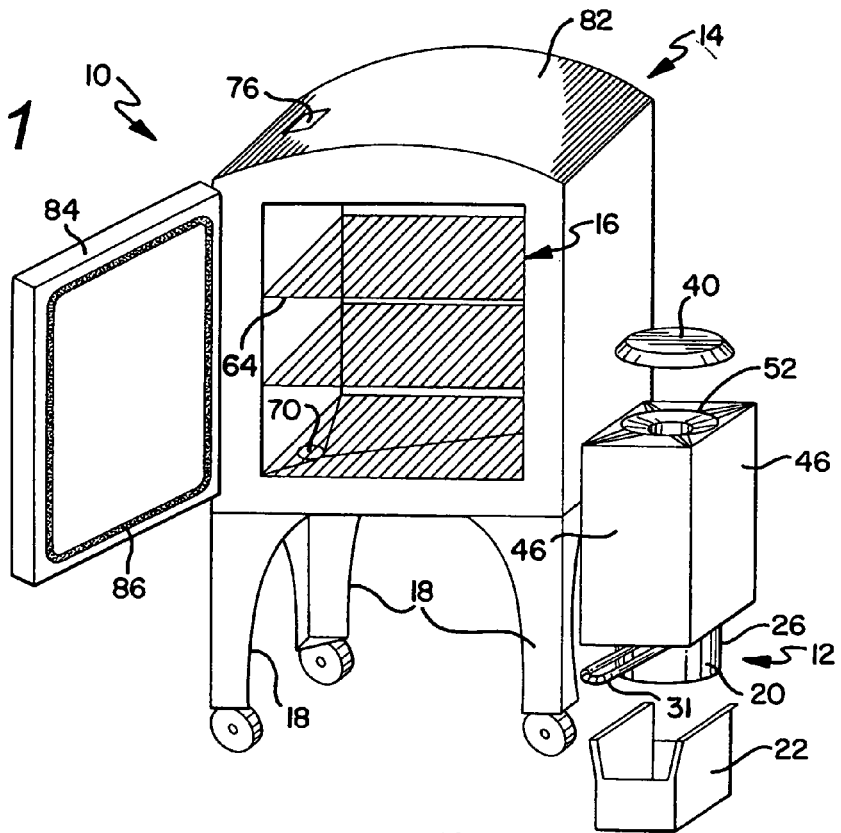
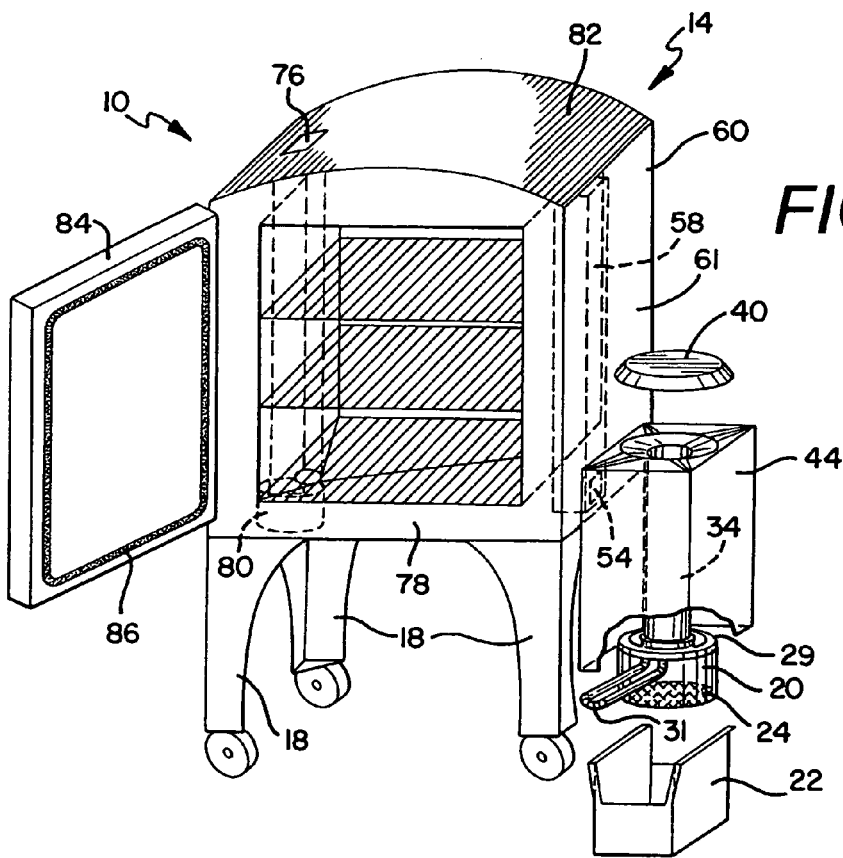

OUTDOOR SMOKING SYSTEM

CROSS-REFERENCE TO RELATED APPLICATIONS

None.

FEDERALLY SPONSORED RESEARCH OR DEVELOPMENT

N/A.

TECHNICAL FIELD

The invention relates generally to an outdoor smoking system with a constant feed smoking device for supplying heated air and smoke to a cooking vessel, and more particularly, to a smoking device having a fuel feed chute configured to automatically provide a steady supply of wood and/or charcoal to a burning chamber.

BACKGROUND OF THE INVENTION

Outdoor cooking equipment, such as smoking devices and barbecue grills, have become increasing popular in recent years because of renewed interest in outdoor cooking. Televised cooking programs and the increase in local food contests and fairs have also added to this increase in popularity.

Conventional outdoor cooking apparatuses use a variety of techniques—ranging in convenience to the user—to cook the food. These include gas burning ovens or barbecues, conventional charcoal or wood burning ovens or barbecues, as well as smoking devices (or smokers). While gas burners can decrease cooking times and increase ease of cooking, slow cooking over charcoal or wood is still used to maximize flavor.

Conventional outdoor smokers include a chamber for burning either charcoal and/or wood. The smoke and heated air is then directed to a cooking chamber to cook items placed therein. The smoke and heated air is then exhausted out of the smoker.

Various problems are associated with existing cooking apparatuses. For example, the ash tray in known existing smokers is normally contained within the burning chamber. This creates a safety hazard and makes it difficult or impossible to remove for emptying during a cooking process. It also is an area that can create build-up requiring strenuous cleaning. Moreover, scraping the ashes out of the burning chamber creates dust which can be a health hazard.

Additionally, most conventional smokers are configured so that rain or snow (or any other material) entering the exhaust stack will flow directly into the cooking area. This can effect gross cooking temperature and temperature uniformity within the cooking chamber (thereby increasing the cooking time) and otherwise ruin the food being cooked by getting it wet.

Another problem with known smokers is maintaining an even continuous temperature in the cooking chamber. Drafts and other structural features in known devices create large temperature fluctuations, effectively creating hot and cold spots in the chamber.

To ensure a high quality smoking environment, it is important to be able to control the gross cooking temperature and maintain temperature uniformity in the cooking chamber. Most current wood and/or charcoal smokers on the market today do not do a good job at either type of temperature control. Instead, user's of such smokers resort to complex or costly implementations to overcome the problems described, and/or resort to alternative heat sources (e.g., electric or gas) which can lower the flavor quality of the smoked product.

To maintain an adequate gross temperature, much of the industry has adopted either electric or gas cooking. Each method has significant downsides. Gas smokers require gas cylinder replacement. These cylinders are typically heavy and cumbersome to exchange. Electric smokers need an electrical source of power. Accordingly, the smoker needs to be near an outlet, or have an electric generator nearby. Additionally, an electric smoker requires on-board hardware and/or software to control the temperature which can ultimately fail. Further, electrical heating elements tend to get dirty from the oil, in vapor and droplet form, produced in the cooking process, which can also lead to failure of the system.

Both gas and electric smokers require a separate smoke creating device because no flavor (i.e., smoke) is created by the heating source. Known smokers, such as the Bradley smoker, the Traegger smoker and others, usually add smoke via an electric feeder that feeds specialized wood pellets or pucks into the cooking area. Again, this adds complexity and cost to the smoker and typically limits the user to only using pucks provided by the smoker vendor.

Temperature variation in the cooking chamber of conventional smokers also creates cooking issues. Typically, smokers employ a heat source into the cooking chamber at a low spot, either by putting the "burner box" physically below the cooking chamber or to the side of the cooking chamber but positioned lower than the chamber. The exhaust of the typical smoker is on the top of the unit. As hot air enters the cooking chamber, it immediately flows to the top of the chamber due to buoyant forces, and then flows out of the exhaust stack. This induces temperature variations from side to side and from top to bottom of the cooking chamber. These variations can be between 50-100 degrees Fahrenheit depending on the smoker design.

To overcome or deal with such temperature variations some smokers are provided with a rotisserie apparatus. The rotisserie apparatus rotates the meat through all the various temperature zones. In this manner, all of the meat is exposed to all of the same temperature variations. However, these apparatuses require an electric motor which places constraints on their location (as explained above with respect to electric smokers). Additionally, the rotisserie apparatus adds moving parts, such as belts, pulleys, gearboxes, etc. to the system which can fail and require maintanence.

Some conventional electric smokers utilize a fan to re-circulate the air throughout the cooking chamber. This helps provide for more uniformity of the temperature throughout the cooking chamber. However, the fan gets extremely dirty due to the oil in the cooking chamber, which requires cleaning and maintenance.

The wood and/or charcoal smokers on the market today often use a "water bath" as a method of dampening temperature variations. In this design, if the temperature of the fire gets too high, the water in the bath will tend to boil, which absorbs much of the excess heat. While the manufacturer's of such smokers claim the moisture from the water bath helps keep the meat in the cooking chamber moist, in reality any meat cooked above 212 degrees Fahrenheit for more than four hours looses much of its inherent moisture. At those temperatures, water becomes vapor and acts like a gas, in which air has a very high capability to absorb this vapor. In this situation, all substances, including meats, will tend to dry out.

The present invention is provided to solve the problems discussed above and other problems, and to provide advantages and aspects not provided by prior smoking devices. A full discussion of the features and advantages of the present invention is deferred to the following detailed description, which proceeds with reference to the accompanying drawings.

SUMMARY OF THE INVENTION

The present invention is directed to a smoking system having a smoking device with a constant feed fuel supply chute for supplying heated air and smoke to a cooking vessel. The design of the smoking system described herein provides for extended cooking times with very tight temperature control without requiring significant (or any) user interaction with the system during the cooking process. The extended cooking time and temperature control allow for uniform temperatures within the smoking or cooking chamber of the cooking vessel. This is accomplished over a variety of climatic conditions, including cold and hot weather, and during rainy or snowy conditions. The present design also allows easy access and cleaning of oil drippings and ash production created in the cooking process.

Additionally, the present design allows for using commonly available, non-specialized wood or charcoal products while providing superior gross temperature control to the smoker, without requiring an additional electric or gas heater, or a water-bath. It also provides superior temperature uniformity without requiring additional electrical apparatuses (e.g., rotisseries or fans) by introducing the hot air at the top of the cooking chamber and exhausting the hot air at the bottom of the cooking chamber. In this manner, the heat will not by-pass the meat in the cooking chamber. Instead, the hot air will uniformly flow downward over the meat.

According to one embodiment of the invention, a smoking device for providing heated air and smoke to a cooking chamber of a cooking vessel comprises a container including a bottom wall and a sidewall extending upward from the bottom wall to form a cavity defining a burning chamber in the container. The burning chamber is for burning a smoke creating material, such as charcoal and/or wood. The sidewall can be a single round (i.e., cylindrical) wall or can be formed to have a plurality of sides (e.g., rectangular). The bottom wall includes a grate in at least a portion of the bottom wall for allowing ash created from burning the smoke creating material to fall out of the cavity. The grate portion has an open-mesh design to allow air to move upward into the burning chamber and ash to fall downward out of the burning chamber. Alternatively, the entire bottom wall can be formed from the grate.

The smoking device further includes a feed chute having a first lower opening for gravity feeding the smoke creating material into the burning chamber of the container. The feed chute is positioned so that the smoke creating material in the feed chute is continuously fed into the burning chamber as ash leaves the burning chamber through the grate. In this manner, the burning chamber maintains an approximately constant mass of smoke creating material through the cooking process. The feed chute includes a second, upper opening for providing access to the feed chute for supplying the smoke creating material to the feed chute.

The smoking device also comprises an adjustable damper positioned above the burning chamber of the container to control the flow of smoke and heated air from burning of the smoke creating material out of the burning chamber through vents in a top wall of the container. This, in effect, controls the temperature in the cooking chamber of the cooking vessel. The adjustable damper is positioned between the burning chamber and the cooking chamber of the cooking vessel.

The smoking device further comprises a removable ash collector positioned below the grate in the bottom wall. The removal of the ash collector can be accomplished without disturbing the burning chamber.

A supply duct having a first opening coupled to the container can be provided for receiving heated air and smoke from the burning chamber of the container. The supply duct includes a second opening coupled to a cooking vessel for delivering the heated air and smoke to the cooking chamber of the cooking vessel.

The feed chute can include a removable lid or cap for covering the second opening of the feed chute. Additionally, a hopper can be coupled to the second opening of the feed chute. The hopper includes one or more inclined segments or portions for directing or funneling the smoke creating material into the second opening of the feed chute. Preferably, the top wall of the container can include an aperture and the feed chute can be positioned to feed the smoke creating material through the aperture in the top wall into the burning chamber. The lid or cap, and hopper arrangement is preferably positioned to be about waist high. This allows a user to easily load the feed chute with the smoke creating material directly from the container it came in without necessarily having to physically touch the smoke creating material by hand. In contrast, traditional smokers typically require the user to physically scoop the material out of the container and place it into the burning chamber.

In accordance with another embodiment of the invention, a system for smoking meats and other food products comprises a smoking device having a container with a bottom wall, a sidewall extending from the bottom wall and a top wall connected to the sidewall to define a burning chamber. A cooking vessel is coupled to the smoking device. The cooking vessel includes a bottom wall, a sidewall extending upward from the bottom wall, and top wall, wherein the bottom wall, sidewall and top wall define a cooking chamber. The bottom wall of the cooking chamber can be configured to slope at an inclined angle to an opening for oil drippings. A feed chute is configured to provide a supply of fuel to the burning chamber wherein the fuel is gravity fed into the burning chamber through a first opening in the feed chute.

The cooking vessel also includes a first duct in the sidewall having a first outer opening proximate a lower portion of the sidewall for receiving smoke from the smoking device, and a second internal opening proximate a top portion of the cooking chamber for delivering the smoke to the cooking chamber. A damper assembly is positioned between the burning chamber and the first outer opening of the first duct in the cooking vessel. The damper assembly is configured for controlling the flow of heated air and smoke from the smoking device to the cooking vessel.

The system further includes a smoke chamber positioned above the top wall of the burning chamber. The smoke chamber has a first opening for fluid communication with the first outer opening in the first duct.

The system can further include a second duct in the sidewall of the cooking vessel for exhausting smoke in the cooking chamber. The second duct is positioned on a side of the cooking vessel opposing the first duct to require the heated air and smoke to traverse the cooking chamber. The second duct includes a first internal opening positioned proximate a bottom portion of the cooking chamber, and a second external opening proximate the top of the cooking vessel.

According to yet another embodiment of the invention, a smoking device for supplying heated air and smoke to a cooking vessel comprises a container having a bottom wall, a sidewall extending from the bottom wall, and a top wall connected to the sidewall to form a burning chamber. A support structure for supporting the container above a removable ash collector is provided, wherein the bottom wall of the burning chamber includes a grate portion for allowing ash created in the burning chamber to fall into the removable ash collector. A feed chute having a first lower opening is positioned above the bottom wall of the burning chamber and is configured to gravity feed a smoke creating material to the burning chamber. The feed chute further includes a second upper opening for providing access for supplying the smoke creating material to the feed chute. The feed chute can be coupled to the burning chamber through the top wall. A smoke chamber is positioned above the top wall of the burning chamber wherein the top wall includes at least a first aperture for allowing heated air and smoke created in the burning chamber to flow into the smoke chamber. A damper is positioned proximate the first aperture to control the flow of heated air and smoke from the burning chamber to the smoke chamber. The damper can include a handle for rotational adjustment.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1 is a perspective view of a smoking system in accordance with an embodiment of the present invention;

FIG. 2 is a perspective view of the system shown in FIG. 1 with certain internal features shown in phantom;

DETAILED DESCRIPTION

Figure 3:
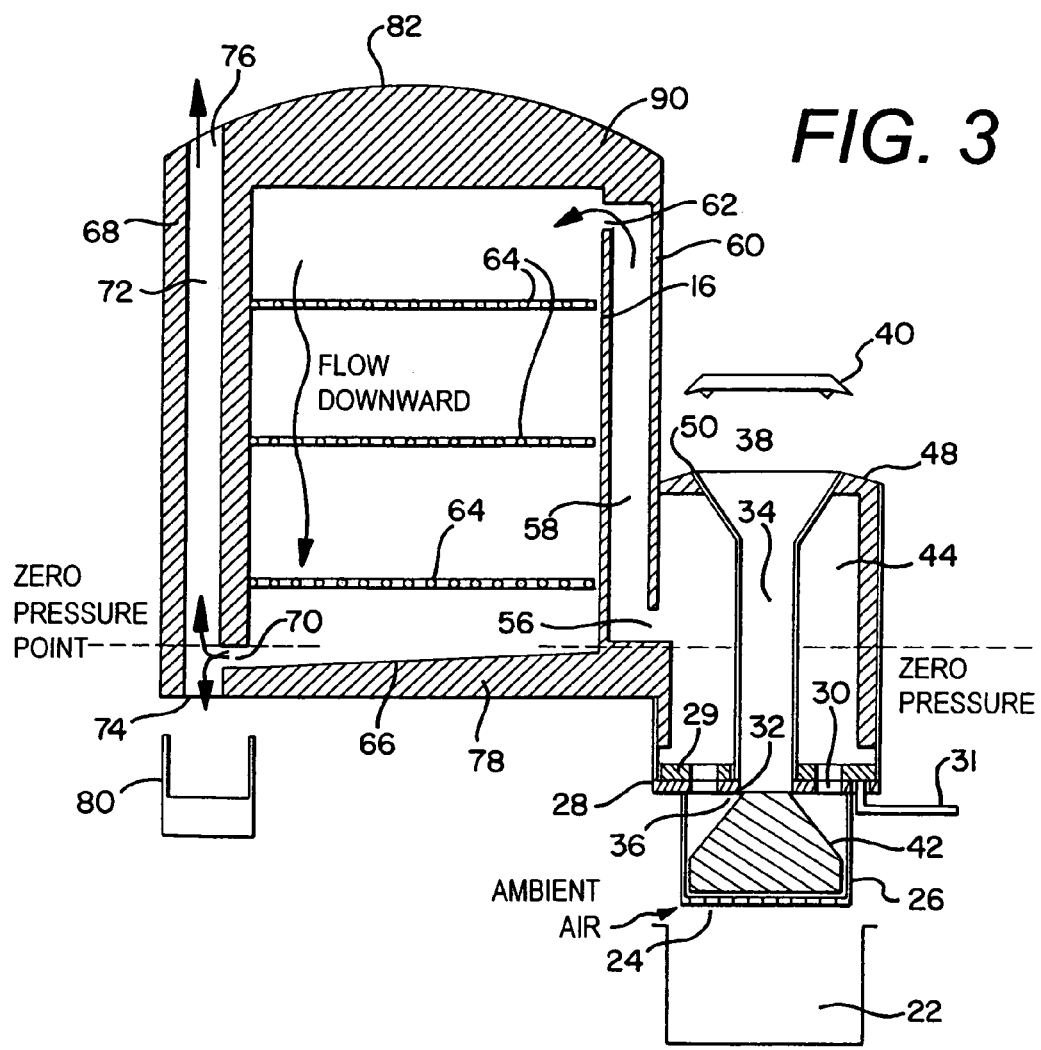
FIG. 3 is a cross-sectional graphical illustration of the smoking system of the present invention; and, FIG. 4 is a temperature chart illustrating the internal temperature of the cooking chamber of the present system over a period of time.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

An outdoor smoking and heating system 10 in accordance with the present invention is generally shown in FIG. 1 (although traditionally utilized outdoors, the smoking system of the present invention can be used in well ventilated indoor areas and is not strictly limited to outdoor use). The smoking system 10 includes a smoking and heating device or apparatus 12 (hereafter referred to as "smoking device") that is coupled to a cooking vessel 14. The cooking vessel 14 includes a cooking chamber 16 supported by a plurality of legs 18.

The smoking device 12 includes a container 20 positioned above an ash collection system which includes a removable ash bucket or tray 22. As more clearly illustrated in FIGS. 2 and 3, the container 20 includes a bottom wall 24 and a sidewall structure 26 extending upward from the bottom wall 24 to a top wall 28. The bottom wall 24, sidewall 26 and top wall 28 of the container 22 collectively form a burning chamber or cavity for the smoking device 12.

The sidewall structure 26 is shown in FIG. 1 as having a generally cylindrical shape. However, other shapes (such as triangular or rectangular, etc.) having three or more sides or segments, can also be used.

The bottom wall 24 of the container 20 includes at least a portion in the form of an open-mesh grate. Preferably, as illustrated in FIG. 2, the entire bottom wall 24 is formed from the grate. The grate 24 is aligned with an opening in the ash bucket 22.

The top wall 28 includes one or more vent apertures 30 for allowing heated air and smoke in the burning chamber to travel upward out of the burning chamber of the container 20. The top wall 28 also includes an aperture 32 for receiving a fuel supply into the burning chamber.

A temperature control damper 29 having one or more apertures or cut out portions is positioned on the top side of the top wall 28, and is pivotally mounted to open or close (i.e., cover and uncover) the apertures 32 in the top wall 28. The damper 29 includes a handle 31 that extends outward from the container 20. The handle 31 allows a user to slide or rotate the damper from a fully closed position (e.g., the apertures 32 are completely covered) all the way to a fully open position. This controls the cooking temperature in the cooking vessel 14 as explained below. The damper 29 effectively separates the fuel source from the cooking chamber.

As illustrated in the embodiment of FIG. 3, a fuel feed chute 34 is positioned above the container 20. The fuel feed chute 34 includes a first lower end 36 that extends through the opening 32 in the top wall 28 of the container 20, and a second upper end 38. The first lower end 36 includes an opening for allowing fuel stored in the chute 34 to enter the burning chamber of the container 20. The upper end 38 of the feed chute 34 includes an opening for providing the fuel 42 into the feed chute 34. A cap or lid 40 can be used to cover the open upper end 38 of the feed chute 34 as shown in FIG. 3. Because the fuel feed chute 34 is generally positioned above the container 20, gravity causes the fuel supply 42 to feed into the burning chamber until it blocks the path of any additional fuel from entering the burning chamber.

The fuel supply 42 is composed of smoke creating materials, such as charcoal and/or wood (other materials can also be added to enhance the flavor of the items being cooked). The gravity feed chute 34 preferably holds a charge of fifteen to twenty pounds of charcoal and/or wood as the fuel supply 42. This amount allows for extended burn times without requiring the user to constantly interact with the smoking system 10. However, the size of the chute 34 can be varied to provide for larger or smaller charges as desired.

The smoking device 12 includes a chamber 44 positioned above the top wall 28 of the burning chamber of the container 20. The chamber 44 is defined by a sidewall structure having four sides 46 (however, like the container 20, the sidewall structure of the chamber 44 can be other shapes, e.g., cylindrical, etc.).

As illustrated in FIG. 3, the chamber includes a top wall 48, which includes an aperture 50 for the feed chute 34. In this embodiment, the chamber 44 surrounds at least a portion of the feed chute 34, with the upper end 38 of the feed chute 34 being exposed to allow for additional fuel 42 to be added to the feed chute 34.

In the embodiments shown in FIGS. 1 and 2, the top wall of the chamber 44 is constructed as a sloped hopper 52 having one or more included or sloped segments. This allows for easily loading the feed chute 34 with the fuel supply 42 by directing the fuel supply 42 into the opening at the upper end 38 of the feed chute 34.

The chamber 44 includes an opening 54 proximate an upper portion in the sidewall structure 46 that mates with an external opening 56 in the cooking vessel 14. The opening 56 in the cooking vessel 14 is positioned proximate the height of the lower level of the cooking chamber 16 and leads to a supply duct 58 embedded in a sidewall structure 60 of the cooking vessel 14 on a first side 61 of the cooking vessel 14. The supply duct 58 extends from the lower opening 56 to an internal opening 62 in the upper portion of the cooking chamber 16.

The cooking chamber 16 includes a plurality of steel wire or mesh shelves 64 for supporting items to be cooked. The steel shelves 64 are removable for easy cleaning of the shelves 64 or the inside of the cooking chamber 16. Additionally, the shelves 64 are preferably adjustable to accommodate various sized items to be cooked. For example, a user of the system 10 can alter the internal configuration of the cooking chamber 16 to allow for larger and/or smaller sizes of meat to be smoked.

The floor 66 of the cooking chamber 16 is sloped or angled from the first side 61 of the cooking chamber 16 toward a second side 68 of the cooking chamber 16 opposite the first side 61. An internal opening 70 is centrally positioned proximate the lowest portion of the sloped floor 66 of the cooking chamber 16 on the second side 68 of the sidewall structure 60. The internal opening 70 leads to a valve-less exhaust duct 72 embedded in the second side 68 of the cooking vessel 14. The exhaust duct 72 includes a lower external opening 74 at one end of the duct 72, and an upper external opening 76 at an opposing end. The lower external opening allows passage through the bottom wall 78 of the cooking chamber 16 to an oil dripping pan 80 removabley attached to the underside of the cooking chamber 16. The upper external opening 76 extends through the top wall or roof 82 of the cooking chamber 16. Because of the positioning of the exhaust duct any rain, snow (or other external effects) that enters through the top opening 76 will directly drop through to the oil pan 80 without ever entering the cooking chamber 16. Moreover, because the bottom of the exhaust duct 72 is open, higher stack velocities can be achieved as air will be allowed to draft into the bottom of the duct 72 causing the hot air coming from the cooking chamber to accelerate upward due to buoyant forces. With higher stack velocities, the smoke will tend to rise higher and faster and thus minimize any interaction with anyone near the system 10.

The cooking chamber 16 further includes a chamber door 84 for providing access to the internal portion of the chamber 16. The chamber door 84 includes a high temperature seal 86 on the interior facing side of the door 84. The seal 86 in the chamber door 84 provides a near air-tight seal, which reduces energy loss and temperature variation within the cooking chamber 16.

In order for the system to work as effectively or efficiently as possible, it is important that the smoking device 12, and in particular the openings 54, 56 be lower than the cooking chamber exhaust point (i.e., internal opening 70). Preferably, the openings 54, 56 are at least a few inches lower then internal opening 70.

In operation, the feed chute 34 feeds the smoke creating materials, e.g., charcoal and/or wood, into the burning chamber of the smoking device 12. Due to the geometry of the burning chamber and the position of the feed chute 34, a "fixed" mass of charcoal and/or wood 42 is always in the burning chamber. As the charcoal and/or wood is converted to ash (through the burning process), the ash falls through the grate in the bottom wall 24 of the container 20. This lowers the mass of material in the burning chamber and allows the fuel supply 42 still in the feed chute 34 to move down into the burning chamber. In this manner, the mass of fuel 42 in the burning chamber is continuously replenished.

The grate's open mesh design allows air to flow upward into the burning chamber and the ash to easily fall through. The cap 40 covering the upper end 38 of the feed chute 34 prevents air from discharging through the feed chute 34, preventing the fuel supply in the chute 34 from burning until it enters the burning chamber.

The temperature control damper 29 sits above the burning chamber and controls the amount of air that is allowed to flow through the mass of fuel. This is accomplished by adjusting the effective size of the aperture 30 in the top wall 28 by rotating the damper 29 with the handle 31. The size of the apertures through the top wall 28 effects the temperature in the cooking chamber by controlling the air flow (e.g., oxygen flow) and thus, the rate of smoke (and heat) from the smoking device 12 into the cooking vessel 14.

Because the damper 31 is located above the burning chamber, the bottom wall 24 or grate is left completely open. This allows the ash container 22 to be easily removed for emptying at any time, even when cooking, without impacting the burning process or temperature control. Accordingly, the present design allows for zero interactive effort with the cooking process for dispensing ash.

Heated air and smoke from the burning chamber flows upward into the upper chamber 44 of the smoking device 12 through the vent apertures 30 in the top wall 28. The heated air and smoke then flows into the supply duct 58 to the top of the cooking chamber 16. The heated air and smoke then flows downward through the items (typically meat products) on the shelves 64 to the exhaust duct 72 to discharge above the system 10 to the atmosphere through the opening 76 (if placed indoors, an additional exhaust duct can be coupled to the system 10 proximate the opening 76 to direct the exhaust out of the building).

The present design eliminates the "drafting" effect inherent in most conventional smokers today. Instead, the design described herein provides a stable hot air bath around all of the cooking material and eliminates the influence of temperature/density based on draft on the amount of air being pulled through the burning chamber. By eliminating the "draft" effect, an external damper on the discharge exhaust duct is not required. Because of the density difference between the hot air in the cooking chamber and the cold ambient air, a stable air pattern is established where the cold air will not enter the cooking chamber 16. The combination of an external duct, downward heat flow and a pressure-breaking discharge allows for better overall cooking temperature control and cooking uniformity through the cooking chamber 16.

The valve-less oil drip opening 74 allows the oil evolving from the cooked meat to automatically discharge from the cooking chamber 16 via the sloped floor 66. The oil will thus flow out of the chamber 16 and into the oil bucket 80 for easy removal.

Various studies have shown that oil drops that fall directly on a heating source, such as in a conventional barbeque grill, may create a carcinogenic gas. In the arrangement of the system 10 shown in FIGS. 1-3, the oil does not drip on any heating elements. This reduces or eliminates any potential carcinogenic gases from the oil.

Figure 4:
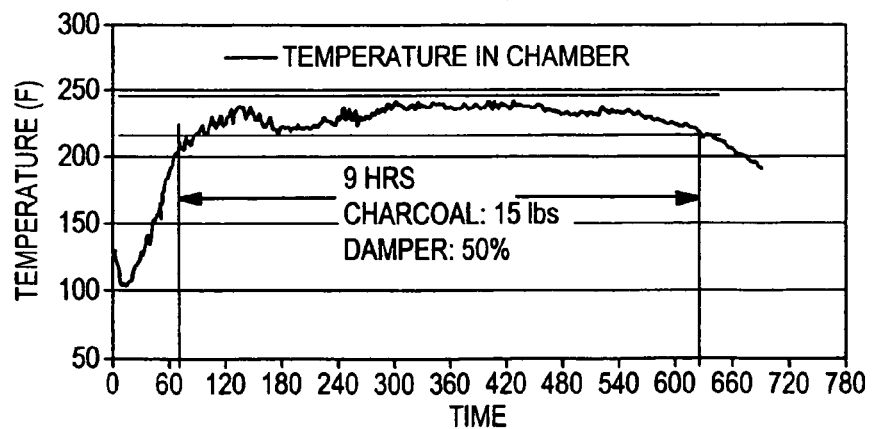

After the cooking chamber is set to the desired temperature (via adjustment of the damper 29), the system can cook uniformly without interruption for hours. FIG. 4 illustrates the temperature in the cooking chamber 16 from a fifteen pound charge over time (shown in minutes) in a prototype of the present design. The temperature control damper 29 is set to open the vent apertures 32 to 50%.

The first sixty minutes show the cooking chamber 16 heating up to between 220-250 degrees Fahrenheit. The chamber 16 then maintains a steady temperature for approximately the next nine hours. These results were achieved without adding additional fuel after the initial charge and no interaction with the damper after reaching the set point temperature. If fuel were added toward the end of the run, the illustrated temperature could have been extended for as long as fuel was added.

Preferably, the cooking chamber 16 (as well as components of the smoking device) include external insulation 90. This allows the system 10 to work within any climate with very little impact to fuel supply 42 usage or temperature uniformity within the cooking chamber 16.

Every attempt is made on the disclosed system for a clean design. All external surfaces are smooth, and sloped if at all possible (e.g., the rounded roof design 82 of the cooking vessel 14) which helps eliminate the build-up of cooking by-products.

Additionally, the components of the preferred system will include continuous welds. This allows all surfaces to be easily water cleanable. Moreover, this should also reduce or eliminate any cracks or crevices for build-up to occur.

While the specific embodiments have been illustrated and described, numerous modifications come to mind without significantly departing from the spirit of the invention, and the scope of protection is only limited by the scope of the accompanying Claims.

What is claimed is:

1. A smoking device for providing heated air and smoke to a cooking chamber of a cooking vessel comprising:
   a container including a bottom wall and a sidewall extending upward from the bottom wall to form a cavity defining a burning chamber in the container for burning a smoke creating material, the bottom wall including a grate portion for allowing ash created from burning the smoke creating material to fall out of the cavity;
   a feed chute positioned above the burning chamber having a first opening for gravity feeding the smoke creating material into the burning chamber of the container wherein smoke creating material in the feed chute is continuously fed into the burning chamber as ash leaves the burning chamber through the grate, and a second opening for providing access to the feed chute for supplying smoke creating material to the feed chute;
   an adjustable damper positioned above the burning chamber of the container, the adjustable damper configured to control the flow of smoke from burning of the smoke creating material out of the burning chamber;
   an upper chamber positioned above the burning chamber for receiving smoke from the burning chamber through the damper, the upper chamber configured to transfer smoke to the cooking vessel, wherein the upper chamber surrounds at least a portion of the feed chute.

2. The smoking device of claim 1 further comprising:
   a removable ash collector positioned below the grate in the bottom wall, wherein removal of the ash collector can be accomplished without disturbing the burning chamber.

3. The smoking device of claim 1 further comprising an opening in the upper chamber coupled to the cooking vessel for delivering the smoke to the cooking chamber of the cooking vessel.

4. The smoking device of claim 1 further comprising a removable lid for covering the second opening of the feed chute.

5. The smoking device of claim 1 further comprising a hopper coupled to the second opening of the feed chute, the hopper including an inclined portion for directing smoke creating material into the second opening of the feed chute.

6. The smoking device of claim 1 wherein the grate portion has an open-mesh design to allow air to move upward into the burning chamber and ash to fall downward out of the burning chamber.

7. The smoking device of claim 1 further comprising a top wall in the container having at least a first aperture for allowing smoke to exit the burning chamber depending on the adjustment of the damper.

8. The smoking device of claim 1 wherein the top wall includes a second aperture and the feed chute is positioned to feed the smoke creating material through the second aperture in the top wall into the burning chamber.

9. A natural convection system for smoking meats and other food products comprising:
   a smoking device having a container with a bottom wall, a sidewall extending from the bottom wall and a top wall connected to the sidewall, the bottom wall, sidewall and top wall of the container defining a burning chamber, a feed chute above the burning chamber for supplying fuel to the burning chamber and an upper chamber above the burning chamber for receiving smoke from material burning in the burning chamber, wherein the upper chamber surrounds at least a portion of the feed chute and, a separate cooking vessel coupled to the smoking device, the cooking vessel including a bottom wall, a sidewall having a first side, an opposing second side, a back side and a front side extending upward from the bottom wall, and a top wall, the bottom wall, sidewall and top wall defining a cooking chamber, the cooking vessel including a first duct at the first side of the sidewall having a first outer opening proximate a lower portion of the sidewall for receiving smoke from the smoking device, the first duct having a first internal opening proximate a top portion of the cooking chamber for delivering the smoke to the cooking chamber, and the cooking vessel having a second internal opening at the second side of the sidewall proximate a lower portion of the cooking chamber for exhausting the smoke.

10. The system of claim 9 wherein the fuel is gravity fed into the burning chamber through a first opening in the feed chute.

11. The system of claim 9 further comprising a damper assembly positioned between the burning chamber and the first outer opening of the first duct in the cooking vessel, the damper assembly configured for controlling the flow of smoke from the smoking device to the cooking vessel.

12. The system of claim 10 wherein the bottom wall of the burning container includes a grate portion for allowing ash to exit the burning chamber.

13. The system of claim 12 further comprising an ash collector positioned below the bottom wall of the burning chamber, wherein removal of the ash collector can be accomplished without disturbing the burning chamber.

14. The system of claim 10 wherein the feed chute has vertical walls.

15. The system of claim 9 wherein the bottom wall of the cooking chamber slopes at an inclined angle toward the second internal opening.

16. The system of claim 9 wherein the sidewall of the cooking vessel includes a second duct for exhausting smoke in the cooking chamber, the second duct positioned on the second side of the sidewall, the second duct communicatively coupled to the second internal opening positioned proximate the lower portion of the cooking chamber, and a second external opening proximate the top of the cooking vessel.

17. A smoking device for supplying heated smoke to a cooking vessel comprising:
- a container having a bottom wall, a sidewall extending from the bottom wall, and a top wall connected to the sidewall to form a burning chamber;
- a support structure for supporting the container above a removable ash collector, wherein the bottom wall of the burning chamber includes a grate portion for allowing ash created in the burning chamber to fall into the removable ash collector;
- a feed chute having a first lower opening positioned above the bottom wall of the burning chamber, the feed chute configured to gravity feed a smoke creating material to the burning chamber, the feed chute further including a second upper opening for providing access for supplying the smoke creating material to the feed chute;
- a smoke chamber positioned above the top wall of the burning chamber wherein the top wall includes at least a first aperture for allowing smoke created in the burning chamber to flow into the smoke chamber, wherein the smoke chamber surrounds at least a portion of the feed chute; and,
- a damper positioned proximate the first aperture to control the flow of smoke from the burning chamber to the smoke chamber.

18. The smoking device of claim 17 wherein the grate portion forms the entire bottom wall of the burning chamber.

19. The smoking system of claim 17 wherein the feed chute is coupled to the burning chamber through the top wall.

20. The smoking system of claim 17 further comprising a hopper coupled to the feed chute wherein the hopper forms an upper wall of the smoke chamber.

* * * * *